No. 794,313. PATENTED JULY 11, 1905.
W. P. RICE.
MALT HOUSE AND MALTING APPARATUS.
APPLICATION FILED APR. 5, 1904.

Witnesses
Inventor:
William P. Rice
by Poole & Brown
his Attys

No. 794,313. PATENTED JULY 11, 1905.
W. P. RICE.
MALT HOUSE AND MALTING APPARATUS.
APPLICATION FILED APR. 5, 1904.

Witnesses
Inventor:
William P. Rice
by Poole & Brown
his Attys

No. 794,313. Patented July 11, 1905.

UNITED STATES PATENT OFFICE.

WILLIAM P. RICE, OF CHICAGO, ILLINOIS.

MALT-HOUSE AND MALTING APPARATUS.

SPECIFICATION forming part of Letters Patent No. 794,313, dated July 11, 1905.

Application filed April 5, 1904. Serial No. 201,704.

*To all whom it may concern:*

Be it known that I, WILLIAM P. RICE, a citizen of the United States, and a resident of Chicago, in the county of Cook and State of Illinois, have invented certain new and useful Improvements in Malt-Houses and Malting Apparatus; and I do hereby declare that the following is a full, clear, and exact description thereof, reference being had to the accompanying drawings, and to the letters of reference marked thereon, which form a part of this specification.

This invention relates to improvements in the art of producing malt, and refers more specifically to the apparatus in which and by which the grain from which the malt is produced is handled from the time it leaves the steeping-tubs until it is dried and ready for storage or shipment.

The invention consists in the matters hereinafter set forth, and more particularly pointed out in the appended claims.

Among the objects of my invention is to decrease the cost of producing malt as compared with present methods of malt production, to improve the quality of the malt, to decrease the first cost of a malt-house, and to decrease its size and reduce the cost of power and labor necessary to operate the apparatus in the production of malt and the cost of maintenance of the plant.

Heretofore in the production of malt the steeped grain is first spread upon the flat floor of a germinating-room in a single thickness or layer and remains there for a time necessary to produce the proper germination thereof. This floor has been employed both as a solid floor and a perforated floor and in a house of substantial output is necessarily of considerable area. In the use of a solid floor moistened air is passed over the layer of grain, and the latter is stirred or agitated to allow proper contact of the moistened air with the grain and to prevent the growing grain from becoming matted. In the use of a perforated floor the air is drawn or forced through the floor and the layer of malt on the floor. It has also been proposed to use revolving drums in which the grain is contained both while being malted and while being dried, the agitation of the grain being effected by rotation of the drums. Various systems of drying malt have been contrived and used, all of which, so far as I am aware, fall under one of the two general classes above mentioned—that is to say, either the floor or drum system. In all these systems of malting there is a great wastage of space in both the germinating and drying spaces, for the reason that the grain occupies but a relatively small part of the space required. Such wastage of space is most apparent in a floor system in which the grain occupies but a small part of the height of the germinating and drying rooms, which rooms must be made sufficiently high to admit of a person or proper machinery for handling the grain and malt. For this reason malt-houses are usually constructed with a number of stories and are not only expensive to construct, but are expensive to maintain. An attempt to utilize to the best advantage such space often results in unduly increasing the thickness of the layer of grain with the result of impeding the passage of air therethrough and packing or matting the growing grain, and for this reason the malt is injuriously affected. Furthermore, in the prior system of malting the handling of the grain has been largely effected by manual labor assisted by expensively constructed and operated conveying machinery, and this is a factor which has entered largely into the cost of the production of malt. In order to avoid these and other difficulties, I propose to construct the malting apparatus in such manner as to utilize the space of the malt-house to an extent not heretofore possible in prior malting apparatus, thereby greatly reducing the cost and maintenance of a malt-house of a given output, to greatly simplify and cheapen the handling of the grain during the process of malting, and to so dispose and arrange the grain during its germination and the drying of the malt as to admit of the proper passage of air therethrough with an economical use of power.

To these ends I propose to employ a device or apparatus embracing a plurality of shelves arranged one above the other, upon which the grain is disposed in suitably-thick layers, one over the other, when growing and when being dried, and said shelves are arranged in sets or units with all of the shelves of each unit supported upon or embodied in a unitary structure or frame. Inasmuch as each shelf must be associated with vertical plates or walls to confine the malt thereon, said shelves may be considered the bottoms of compartments located one over the other and adapted to be filled or partially filled with grain or malt. Said shelf units are adapted to be made of a height to practically fill the vertical height of the room containing the same, so as to economically occupy the space between the floor and ceiling of the room. The units are preferably arranged on the floors of the germinating and drying rooms with aisles or spaces between the same, said aisles constituting passages for the distribution of the air to the grain on the shelves. Said units may be made either stationary or may be made in a manner to be portable or moved from place to place. When made stationary or fixed, suitable conveying apparatus is employed for carrying the grain from place to place and for turning the same during germination, and when made portable the grain may be carried or conveyed from place to place while supported on the shelves of the units. In turning the grain during germination it is discharged from the units and may be directed back to the same unit from which it was discharged or to another unit or units, and during the necessary handling for this purpose the grain is properly agitated to loosen the same and prevent the same from packing. Inasmuch as the malt increases in bulk during its germination, shelf-space required for a given quantity of steeped grain at the beginning of the germinating process will necessarily be insufficient as the grain increases in bulk, so that when the malt is turned each day or at other stated periods during its germination other shelf space or units are provided, as the increase in bulk may require.

I have illustrated in the drawings what I deem to be a practical embodiment of my invention, showing in connection with a preferred form of apparatus a number of modifications; but it will be obvious from the foregoing and from the description which follows herein that the structural details of an apparatus embodying my invention may be widely varied while retaining the advantages arising from the use of the invention.

Figure 1:
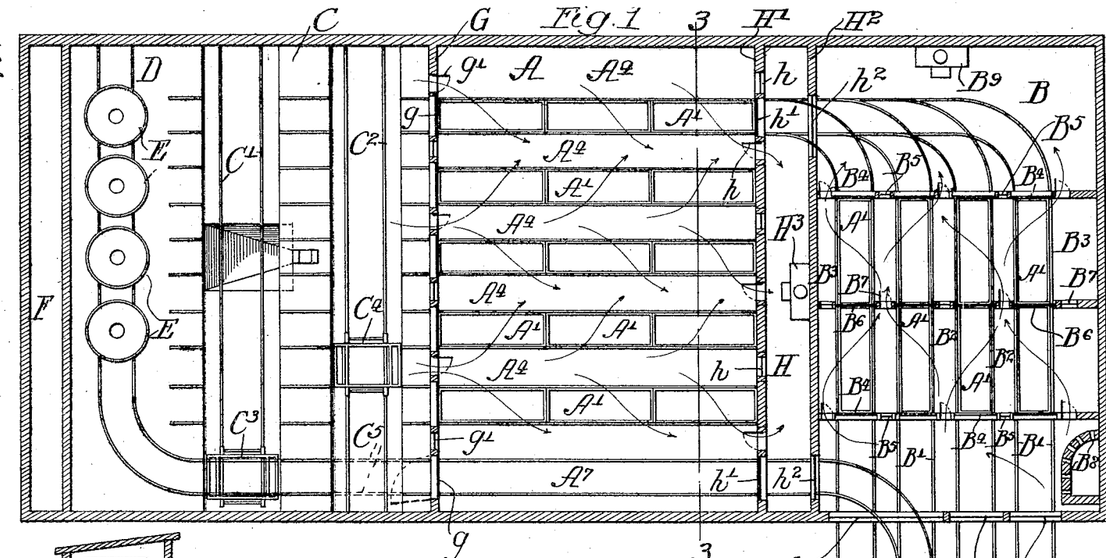
Figure 1 is a horizontal section taken through a malt-house, showing diagrammatically the arrangement of my improved malting apparatus.
Figure 2:
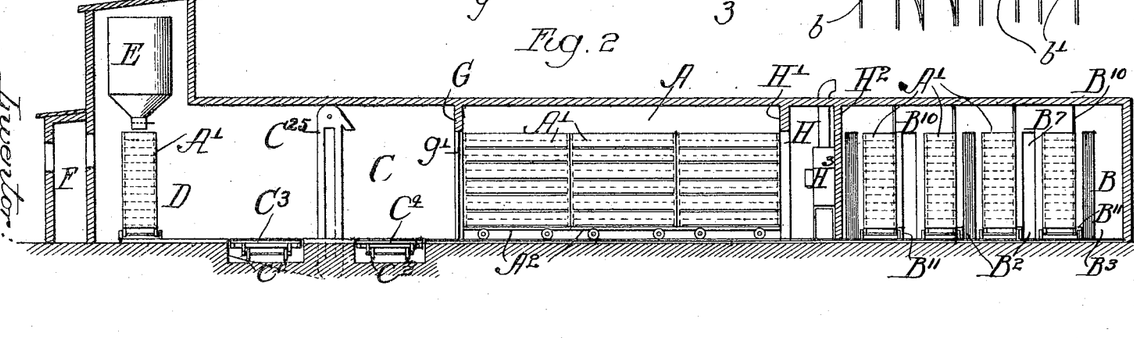
Fig. 2 is a longitudinal vertical section thereof.

As shown in the drawings, and referring more particularly to Figs. 1 and 2, the malt-house consists for the most part of a single story, and the general division of the floor plan embraces a germinating-space A, adapted to contain the units A', hereinbefore referred to, and which, as illustrated in said figures, are movable units, a drying-space B, a transferring-space C, into which the movable units are moved and at which the grain is transferred from one unit to another and the units are transferred from one track to another, a space D, located beneath the steeping-tanks E and into which the units are adapted to be moved to receive the steeped grain from the steeping-tubs, and an attemperating-space F, adapted to contain any desired form of attemperating apparatus. (Not shown.)

The construction of the units, whereby is provided a series of shelves located one above the other for supporting the grain in superposed layers, may be varied. For many reasons the movable type of unit shown in Figs. 1 to 10 is a preferred one, and the construction of said unit will now be described, reference being had more especially to Figs. 6 to 10, which illustrate such details.

Figures 6, 7:
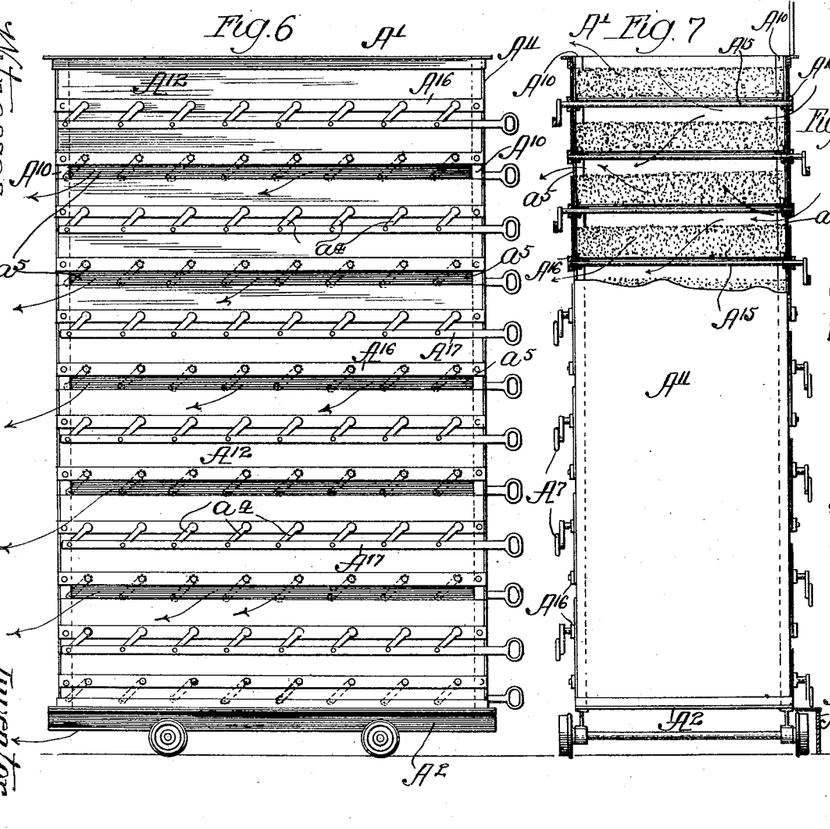
Fig. 6 is a side view of one of the units shown in Fig. 1.
Fig. 7 is an end view thereof with parts broken away.
Figure 8:
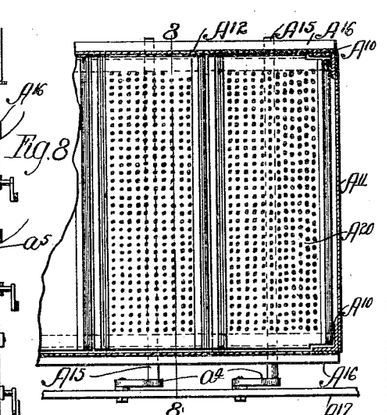
Fig. 8 is a partial plan view showing, on an enlarged scale, the relative positions of the shelf-sections constituting one of the shelves.
Figure 9:
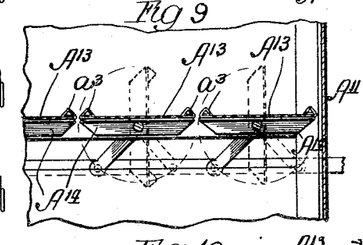
Fig. 9 illustrates the manner of manipulating the shelf-sections to discharge the grain from the units.
Figure 10:
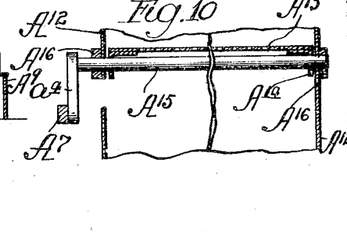
Fig. 10 is a detail section taken on line 10 10 of Fig. 8.

Each unit embraces, as herein shown, a suitable wheeled truck $A^2$, four corner-posts $A^{10}$ $A^{10}$, rising from said truck, end plates $A^{11}$ $A^{11}$, extending between and attached to said posts $A^{10}$, and horizontal side plates $A^{12}$ $A^{12}$ on each side of the unit and attached to the end posts $A^{10}$ and separated by spaces $a^5$, as best shown in Figs. 6 and 7. The said end and side plates $A^{11}$ $A^{12}$ constitute the side and end walls of compartments, the bottoms of which are formed by the shelves referred to. The shelves in the construction shown in figures last mentioned are composed of a plurality of swinging or rotative horizontal sections $A^{20}$, each consisting of a perforated plate $A^{13}$, extending from one side to the other of the unit, and to the ends of which at the under sides are affixed transverse angle-bars $A^{14}$. Each of said shelf-sections is supported on a transverse horizontal shaft $A^{15}$, which extends through the side plates $A^{12}$ and through strengthening-bars $A^{16}$. (Shown best in Figs. 6 and 10.) The side edges of said plates $A^{13}$ are preferably strengthened or reinforced, this being effected in the present instance by folding upwardly the margins thereof to form seams or flanges $a^3$, as shown best in Fig. 9. Each of the shafts $A^{15}$ is provided at one end with a rigidly-attached crank-arm $a^4$, by which the shelf-sections are rotated, and the several crank-arms of the sections of each shelf are loosely connected with an actuating-bar $A^{17}$, by which all the sections of each shelf are simultaneously swung on their axes. When the shelf-sections are horizontal, as shown in full lines in Fig. 9, they constitute a shelf which extends horizontally across the unit and is in position to support a layer of grain thereon. When the grain is to be discharged therefrom, the shelf-sections are turned or rotated to the positions indicated in dotted lines in Fig. 9. When emptying a unit, the dumping of the shelves begins with the lower one, and when filling an empty unit the sections of the lowermost shelf are first swung into their horizontal position, and thereafter the compartment of which said shelf constitutes the bottom is filled, and this operation is repeated with each successive superjacent shelf and compartment.

It will be observed by reference to Fig. 6 of the drawings that the spaces $a^5$ between the plates $A^{12}$ on one side of each unit are located out of line with the like spaces on the other side of said unit. It will be furthermore observed that each set of shafts $A^{15}$ for the shelf-sections extends centrally through one plate at one side of each unit and near the lower edge of another plate at the opposite side of the unit, whereby each compartment of the unit formed by the shelf as a bottom and the plates $A^{11}$ and the plates $A^{12}$ as the ends and sides, respectively, are open only at one side of the compartment and near the upper side thereof, while the other side and the end is closed, and that the adjacent compartment, either above or below the same, is provided at the opposite side of the unit with a like opening. Thus it will be seen that when considering any two adjacent compartments one is open at one side of the unit, while the other is open at the other side thereof. The compartments of which the shelves constitute the bottoms are designed to be filled with grain to the level of the openings $a^5$ at one side thereof, and when so filled air-passages are formed above the layers of grain and between the same and the superjacent shelves, through which passages air may enter the unit and pass both downwardly and upwardly through the layers of grain above and below and through the shelves on which the grain is supported, as indicated by the arrows in Figs. 3 and 7.

The germinating-space A is divided from the transferring-space C by a partition G, provided with suitable doors $g$, through which the malting units may pass into and out of the germinating-space, and other doors, $g'$, which are located at the ends of and are adapted to open and close aisles or passages $A^4$ between the rows of units in the germinating-space and between the side rows of units and the walls of the building, said passages directing the air properly to and from the units. Located between the germinating and drying spaces is a transverse passage H, formed between two transverse partitions H' $H^2$, the latter constituting the wall of the drying room or space and the former constituting the adjacent wall of the germinating-space. The partition H' is provided with openings at the ends of the aisles $A^4$, closed by doors $h$, and said partitions H' $H^2$ are provided with openings closed by doors $h'$ $h^2$ for the passage of the units from and to the germinating-space. The malting units are supported and travel when in the germinating-space on tracks $A^3$. Said tracks extend through the doors $g$ of the partition G into the transfer-space, and one of the side tracks extends into the drying-space through the doors $h'$ $h^2$. Said tracks are located a distance apart to provide suitable width for the aisles or passages $A^4$ between the rows of units. Attemperated air is introduced to the aisles through the doors $g'$ and is drawn through the aisles and units by means of a suitable fan $H^3$, located in the air-space H and provided with an outlet-pipe which discharges outside of the building. The rows of units entirely fill the length of the germinating-space, so that air will not pass from one aisle to the other around the units, and shields $A^8$ $A^9$ are provided at the tops and bottoms of the units to prevent air from passing from one aisle to the other over or under the units. Each aisle therefore constitutes a separate and independent air-passage communicating with its air admission or discharge door, as the case may be. Each alternate aisle is open at one end to the admission of attemperated air and is closed at its other end. The attemperated air which enters the aisles or passages passes horizontally through the openings $a^5$ at the sides of the units and into the air-passages above the layers of grain on the shelves and from thence passes both upwardly and downwardly through the layers of malt above and below said passages and outwardly through the openings $a^5$ in the opposite sides of the unit and into the suction or low-pressure aisle, which communicates with the passages H. Each alternate aisle constitutes, therefore, a high-pressure or plenum aisle and communicates through the doors $g'$ with the source of attemperated air, and the other aisles communicate with the suction-passage and constitute the vacuum or low-pressure aisles. Attemperated air entering any given aisle passes, therefore, in opposite directions through the units into the adjacent or low-pressure aisles. By reversing the opening and closing of the doors $g'$ $h$ the relative pressures in the aisles are changed, and the direction of the air-currents laterally through the units and vertically through the layers of grain on the shelves of the units is reversed. This may under certain circumstances be advantageously done. In the aisle $A^4$, at one side of the germinating-space, is located a track $A^7$, which extends at one end into the space D beneath the steep-tubs E and by which the units are transferred to the space D to receive from the steep-tubs charges of steeped grain. The other end of the track $A^7$ extends through the passage H, the drying-space, and through a passage in the side wall of the building closed by a door $b$.

The drying-space B is provided with a plurality of tracks $B'$, four being herein shown, and upon which are supported the units in the drying space or room when containing the malted grain to be dried. Said tracks $B'$, as herein shown, extend transversely of the tracks $A^3$ of the germinating-space. Said tracks $B'$ are connected, by suitable switch connections, (indicated diagrammatically in Fig. 1,) with the last track $A^3$ of the series, so that the units may be transferred from said last track of the series in the germinating-space to either one of the tracks in the drying-space. The tracks in the drying-space extend through openings in the side wall of the building, closed by doors $b'$, whereby the malt after being dried in said units may be transferred while still contained therein to a warehouse outside the malt-house or to conveying mechanism for transferring the dried malt to cars. The track $A^7$ is connected by a suitable switch with one of the tracks $B'$, whereby the units after being emptied of the dried malt may be transferred over the track $A^7$ to the steep-tubs and again filled with steeped grain.

The tracks $B'$ in the drying-space B are separated by suitable spaces, affording between the units when the tracks are filled aisles $B^2$ $B^2$ and between the side tracks and the walls other aisles $B^3$. At the ends of the aisles $B^2$ are provided partitions having openings closed by doors $B^5$, through which drying-air is admitted to and discharged from the aisles, and said partitions are provided with other openings closed by doors $B^4$, which afford for the units ingress to and egress from the space between said partitions. An intermediate partition is provided which divides the advance set of units from the rear set of units, and said partition has openings closed by doors $B^7$, arranged in line with the aisles $B^2$ $B^3$, and other openings in line with the tracks and closed by doors $B^6$. The drying-space B is provided with a furnace $B^8$ and an air-forcing device $B^9$, which latter directs the heated air from the furnace through the aisles or passages $B^2$ and through the layers of grain in the units. The particular lateral or horizontal direction of the air-currents through the several units and the vertical direction thereof through the layer of malt on the shelves in the units is determined by combination of opened and closed doors $B^5$ $B^7$ of the aisles $B^2$ $B^3$, as in the arrangement of the air-directing devices in the germinating-space, as hereinbefore described. The presence of the intermediate partition in the drying-space mentioned divides the aisles into lengths practically that of the units, so that the doors of each section of the aisles $B^2$ $B^3$ are opened and closed in the same manner as are the doors of the aisles $A^4$ of the germinating-space to produce the lateral passage of the dry-air currents through the units. The provision of the intermediate partition having the doors $B^7$, as shown in Fig. 1, insures that all of the air entering either of the aisles shall pass first through the set of the units next adjacent to the furnace and thereafter pass through the other units. Shields $B^{10}$ and $B^{11}$, like the shields $A^8$ $A^9$, before referred to, are provided at the tops and bottoms of the units to prevent air from passing from one aisle to the other over or beneath the units.

The malt requires for drying a period of forty-eight hours, and it is designed that one set of units shall be delivered into the drying space or room containing a charge of green malt, while another set, containing a charge of dried malt, will be discharged from said space each day. Therefore each day one set of units filled with dry malt is discharged from the drying-space, another set, containing partially-dried malt, is advanced toward the furnace, and a third set, filled with green malt, is delivered from the germinating-space to the rear part of the drying-space. With this arrangement, therefore, the partially-dried malt always receives the hottest air and the green malt is subjected to the air after it has passed through the partially-dried malt and is therefore considerably cooled.

The direction of the drying air-currents may be reversed by reversing the relative positions of the doors $B^5$ $B^7$—that is to say, by opening those which were before closed and closing those which were previously opened. It thus becomes possible by reversing the combination of the opened and closed doors to reverse the currents of drying-air through the layers of grain, and thereby render it unnecessary to turn the grain during the drying process—obviously a great advantage in point of saving operating expense.

Next describing the means for transferring the units from the track $A^7$ to the several tracks $A^4$ and also from either of the latter tracks to the other devices are provided therefor as follows: $C'$ $C^2$, Figs. 1 and 2, designate tracks extending transversely across the transfer-space below the level of and at right angles to the tracks $A^4$. On each track travels one or more transfer-cars $C^3$ $C^4$. Each car is provided on its upper side with a short track, which is adapted to register with the tracks $A^4$ $A^7$. Any of the units, therefore, may be transferred from either of the tracks $A^4$ and $A^7$ to the other tracks, this being effected by running the unit to be transferred upon one of the transfer-cars and thereafter moving said transfer-car into line with the track which is to receive said unit. The transfer-cars may serve as means for bridging the depressions containing the tracks $C'$ $C^2$ when a unit is to be passed over said depressions; but if at any time a unit is not available for this purpose bridge-rails $C^5$ (indicated in dotted lines in Fig. 1) may be employed.

In the form of apparatus shown in Fig. 1 it is designed that the transferring of the grain from one unit to the other or to the same unit from which it was discharged for the purpose of turning the grain shall be effected through the combined action of the transfer-cars $C^3$ $C^4$ and a suitable elevator $C^{25}$. (Shown best in Fig. 4.) When the grain is to be thus transferred from one unit to the other, the filled unit is carried by one of the transfer-cars over the pit $C^6$ of the elevator $C^{25}$, and an empty unit may be carried by the other car beneath the discharge-spout of said elevator. The grain is discharged from the filled unit to said pit and is by the elevator carried to an empty unit, which may be another unit or the same unit from which the grain was discharged. In certain stages of the germinating process the growing grain from one unit is transferred to two units to thereby accommodate the subsequent increase in bulk, which will take place in the units last filled. Thereafter the filled unit or units are transferred to the proper track $A^4$, and the empty unit is directed to a storage-space or to the steeping-tubs to be again filled.

Figures 3, 4, 5:
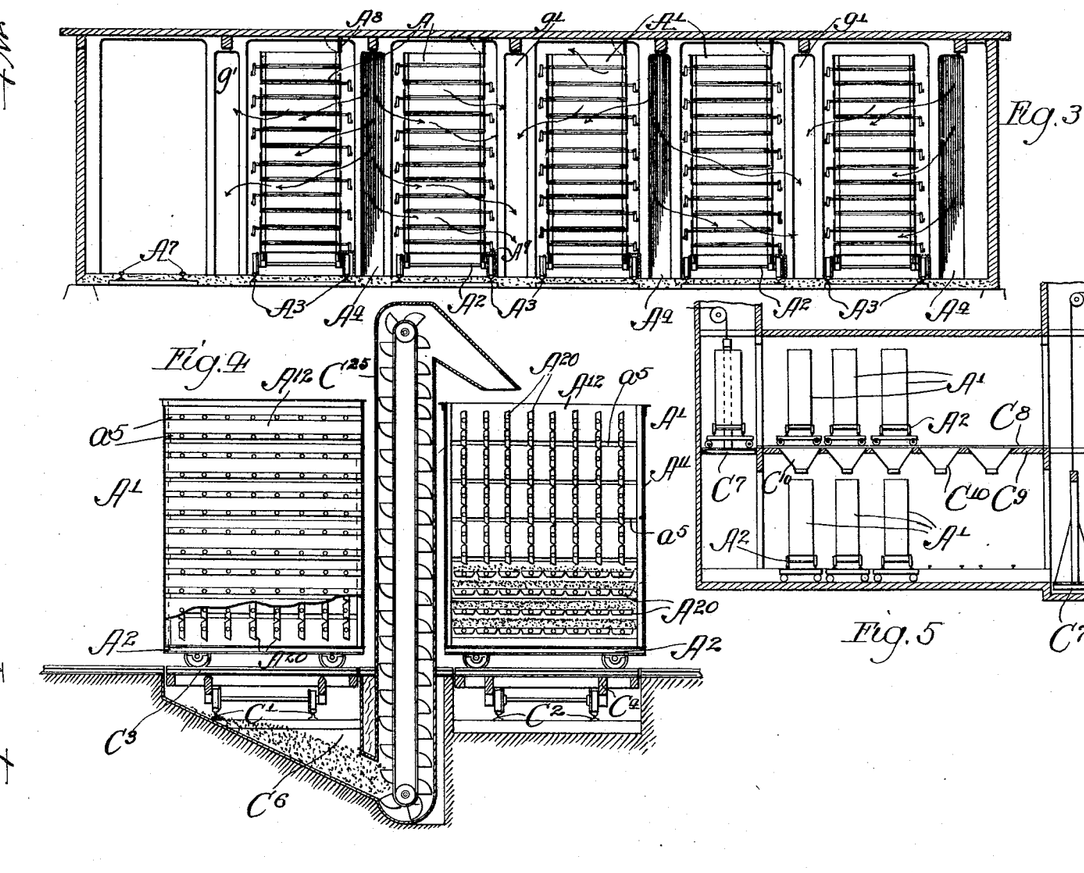
Fig. 3 is a transverse vertical section taken on line 3 3 of Fig. 1.
Fig. 4 is a detail vertical section showing the means for transferring the grain from one unit to another for the purpose of turning the germinating grain.
Fig. 5 illustrates a modified form of apparatus for transferring the grain from one unit to another.

Instead of transferring the grain from one unit to the other by the means just described I may employ the means indicated in Fig. 5, where two elevators or hoists $C^7$ $C^7$ are provided, one at each end of the track $C'$, and by means of which the units are elevated to and lowered from a track $C^8$ on an upper or second floor $C^9$. Said elevators or hoists are provided with short tracks which are adapted to register with the tracks $C'$ when in their lowermost positions and to register with the tracks $C^8$ when in their uppermost positions.

The units when elevated to the second floor $C^9$ in the manner indicated are directed over the tracks $C^8$ to the hoppers $C^{10}$, extending through the floor and located in positions to direct the grain into units beneath the hoppers, which are supported on transfer-cars on the track $C'$. With this construction it will be observed that the transfer of grain from one series of units to another may be effected much more rapidly than by the first method described, inasmuch as five upper units may be simultaneously emptied into five lower units. When this form of apparatus is used, the track $C^2$ will preferably be retained, inasmuch as it affords means whereby cars may be transferred from one track $A^4$ to the others while the track $C'$ is filled or partially filled.

In case the shelves be imperforate and air be directed over instead of through layers, as in the case of the familiar form of floor system, the openings in the compartments of the units will be changed to permit the air to pass directly through the same.

The operation of the apparatus just described will be readily understood, but may be briefly recapitulated, as follows: In first starting the system in operation a suitable number of the units are run over the track $A^7$ to the space beneath the steep-tubs and are there filled with steeped grain. The filled units are thereafter directed to the track $A^4$ next adjacent to the track $A^7$. The number of units so filled depends upon the length of the tracks $A^4$ and the number of units on each track. As the grain is turned and is deposited in other units the said other units containing the turned grain is advanced to the next track $A^4$, and this is continued until all the tracks are filled. Five tracks are herein shown adaptable to a five-day house or one in which the germinating period is five days. When a series of units have reached the track $A^4$ at the side of the germinating-room remote from the track $A^7$ or which may be termed "track No. 5" in the series and remains there one day, the germinated grain is ready for the drying-room, and said units are directed from said track to the tracks of the drying-room. In this manner one series of units is filled from the steep-tubs each day and another series is taken from the germinating space or room to the drying-room. In the drying room or space one set of units is withdrawn at the time a set containing a charge of green malt is delivered to the drying-room. The drying operation is carried on and completed without the necessity of turning the malt, it being only necessary to reverse the direction of the drying air-currents therethrough. After the malt is fully dried it is carried out of the drying-space in the units in which it has been dried to a suitable place for its disposal, as a storage-warehouse.

The rotative shelf-sections are made of such width and are located such distance apart that the lower margins of said sections when vertical, or in their dumping positions, are practically free of the grain in a filled compartment beneath, so that when the said sections are swung upwardly they will not carry upwardly any part of a subjacent layer unless said subjacent layer be too deep, in which event said lower margins of the sections would exercise a leveling function on the layer of the grain beneath. In practice the layers of grain on the shelves may be about eight inches in depth, and the shelf-section substantially one foot in width, so that a space of about six inches would be required between each layer of grain and the next shelf above, which space constitutes the opening to receive air which flows laterally thereinto from the aisles or air-passages. The proportions mentioned are not, however, followed in the drawings herein.

Figure 11:
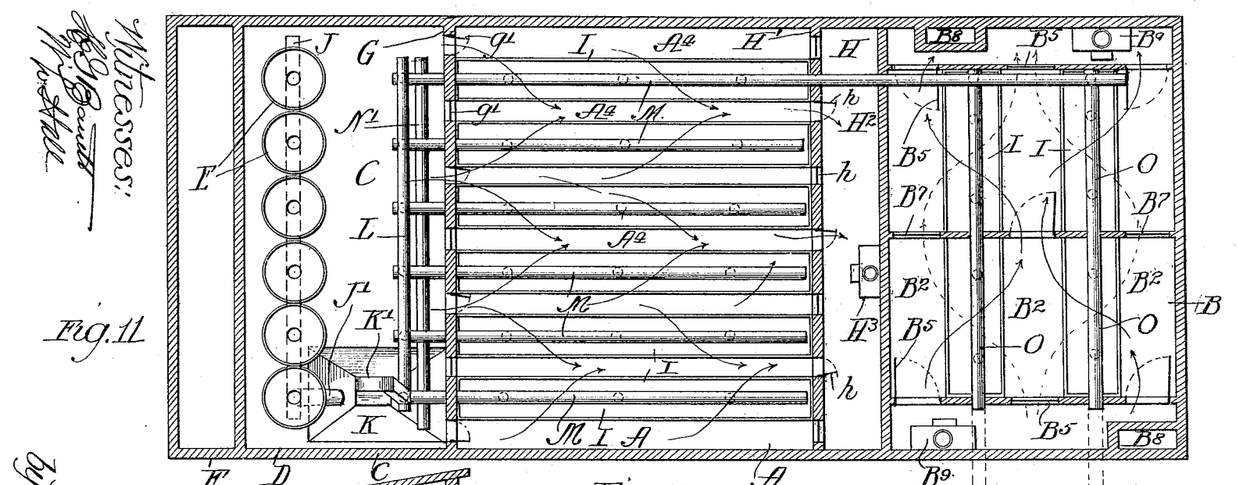
Fig. 11 is a horizontal section taken through a malt-house, showing a modified form of unit and mechanism for transferring the grain from one unit to the others.
Figure 12:
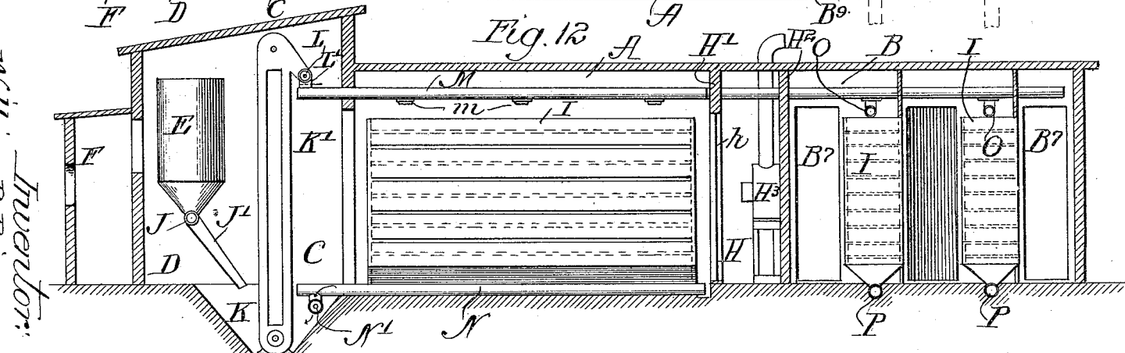
Fig. 12 is a longitudinal vertical section of the house shown in Fig. 11.
Figure 13:
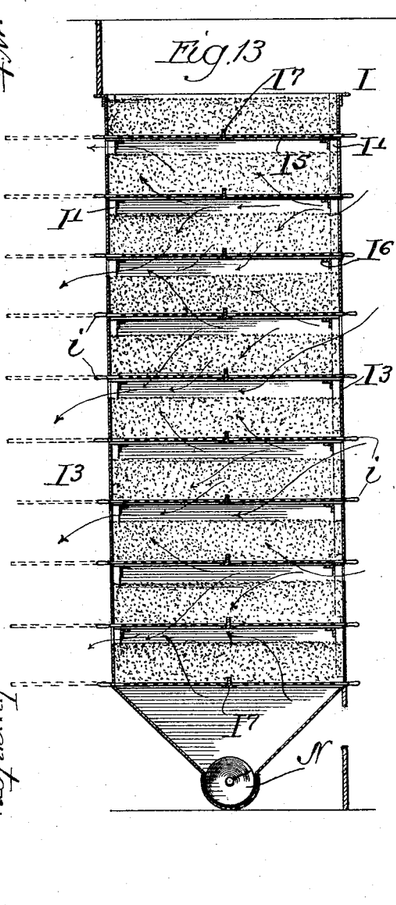
Fig. 13 is a transverse section taken through the form of unit shown in Fig. 11.
Figure 14:
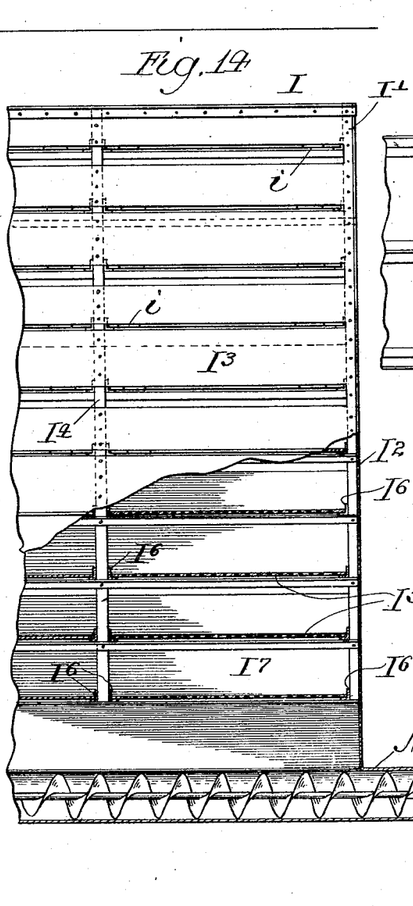
Fig. 14 is a partial longitudinal section thereof.
Figure 15:
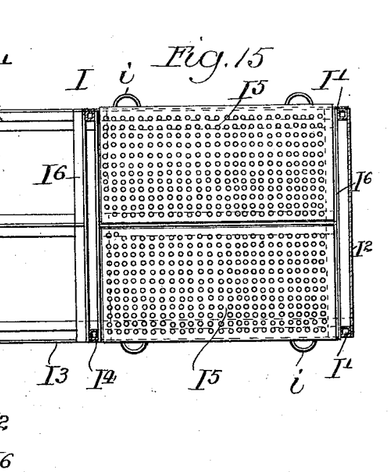
Fig. 15 is a partial plan view of the form of unit shown in Figs. 13 and 14.

In Figs. 11 to 15 I have shown a modified form of unit and also another means for handling the grain during the turning process. In this form the units are stationary and may be made of a length practically equal to the length of the spaces or rooms containing the same. Suitable conveying apparatus is provided for transferring the grain to the units and from one unit to the others. In this construction the structural or frame work of the units I is substantially like that shown in the figures first described, and each consists of two corner or end posts I' I', end plates $I^2$, and side plates $I^3$, which latter are additionally supported by intermediate posts $I^4$. The arrangement of the side plates to produce the openings for the ingress and egress of air to and from the layers of grain on the several shelves of the units is like the construction shown in the previously-described figures. The shelves or bottoms of the unit-compartments consist of sliding perforated plates $I^5$ $I^5$, made of suitably short sections, (lengthwise of the units,) and each shelf preferably consists of two plates which are closed toward each other and are withdrawn outwardly away from each other, the side walls of the units being provided with slots through which the shelf-sections are withdrawn in opposite directions, as indicated. Said oppositely-sliding shelf-sections rest at their ends on channel-irons $I^6$, which extend between and are attached to the end and intermediate posts I' $I^4$, and they rest at their inner edges when closed on inverted T-beams $I^7$, which extend between and are attached to the I-beams $I^6$. Said shelves are provided with handles $i$ to facilitate their withdrawal. The units are unloaded by withdrawing the shelves, and during the loading operation the shelves are closed from the bottom in the same general manner as are the shelves of the previously-described units. The manner of arranging this form of unit is indicated in Figs. 11 and 12 and is as follows: The partitions G and H' at each end of the germinating room or space and the partition $H^2$ between the air conduit or passage H and the drying-space are the same as the like parts shown in Fig. 1, with the exception that the doors for the ingress and egress of the movable units are omitted, the units being stationary. The aisles $A^4$ and the doors $g'$ $h$ of the partitions G and H' at the ends of the aisles are substantially like the before-described construction. The manner of directing the air through the units is practically the same as in the previously-described construction.

The steeped grain is carried from the steep-tubs to the several units I by means of conveying apparatus made as follows: Extending beneath all the steep-tubs and receiving steeped grain therefrom is a conveyer J, which discharges at one end through a slanting spout J' into the pit K of an elevator K'. Said elevator discharges the grain into one end of a horizontal transverse conveyer L, located above the level of the units and between the same and the steep-tubs. M M designate a plurality of conveyers, one located longitudinally over each unit, and said conveyers extend at their rear ends beneath the transverse conveyer L and are adapted to severally receive grain therefrom, whereby grain may be directed from the conveyer L to either of the units. Said transverse conveyer is connected with the longitudinal conveyers by means of short valved passages L', and all the valves of said conveyers are normally closed except the valve between said conveyer and the conveyer to which it is desired to direct the grain. The longitudinal conveyers are provided with a number of valved discharge-outlets $m$, through which the grain may be delivered to any part of the associated units desired.

The grain is turned by being discharged downwardly from the units into conveyers N beneath the same, which conveyers N communicate at their rear ends with a transverse conveyer N', by which the grain is directed back to the pit of the elevator K'. From said pit the grain may be directed back to either of the units desired through the elevator K' and conveyers L and M. Preferably the grain discharged from one unit during the turning operation is directed to a unit next in advance thereof, counting toward the side of the germinating-space opposite the unit first filled, so that the grain as it is turned from time to time is advanced from one unit to the other in much the same manner as are the units advanced on the tracks of the germinating-space of the construction shown in Fig. 1. The upper conveyer M of the last unit extends through the air-passage H into the drying-room to deliver the green malt to the units in the drying-room in a manner hereinafter to be described. In some instances a germinating-room designed to produce five-day malt is provided with an additional unit, or six units in all, as herein shown. The extra unit is provided to enable the grain to be turned more than once each day when so desired. In such event the extra or spare unit may be utilized to effect the turning of the grain whenever desired.

In the practice of the system outlined one unit is charged with steeped grain each day and green malt is discharged from another unit into the units of the drying-space. Inasmuch as it requires two days to dry the malt, two independent sets of drying units are provided. Each set consists of two units arranged side by side and having an aggregate capacity of one of the units of the germinating-space. The units of one set are arranged in advance of the units of the other set, with a partition between them having the doors $B^7$, as in the construction shown in Fig. 1. At the ends of the aisles $B^2$ between the units and at the sides thereof are located partitions provided with doors $B^5$ like the arrangement shown in Fig. 1. The air is directed through the aisles and the units in the same manner as in the previously-described construction. The green malt is delivered to the units of the drying-space from the extension-conveyer M of the last of the series of germinating units through horizontal conveyers O O, arranged longitudinally over the said units and provided with suitably-arranged valved outlets, (indicated in dotted lines in Fig. 11.) The actuating mechanism for the several conveyers, such as the necessary belts and pulleys, are purposely omitted in order to avoid confusion. Inasmuch as said units of the drying-space are stationary, each set is discharged and loaded every other day, so that for any given day one set of units contains a charge of green malt and another a charge of partly-dried malt, or malt which has been exposed to the drying-current for one day. In accordance with the best practice it is necessary that the drying-air shall enter the opposite ends of the aisles $B^2$ on alternate days in days in order that said air when warmest shall be brought first into contact with the dryest malt and shall be somewhat cooled before it reaches the green malt. This may be effected by reversing, through the use of suitable passages and valves, the air-currents from a single furnace, so that the air passes directly from the furnace to opposite ends of the aisles on alternate days. I have shown, however, a duplicate furnace $B^8$ and a duplicate fan $B^9$, one fan and furnace being located at one side of the drying-room and the other furnace and fan being located at the opposite side of the room. With this construction one of the fans draws the air from one of the furnaces through the aisles and units from one end of the aisles one day and the other fan and furnace is used the succeeding day to reverse the current of air, so that it will enter the opposite ends of the aisles. The dried malt is discharged from the units to the outside of the drying-room through suitable conveyers P, located beneath the units, as shown in Fig. 12.

Figure 16:
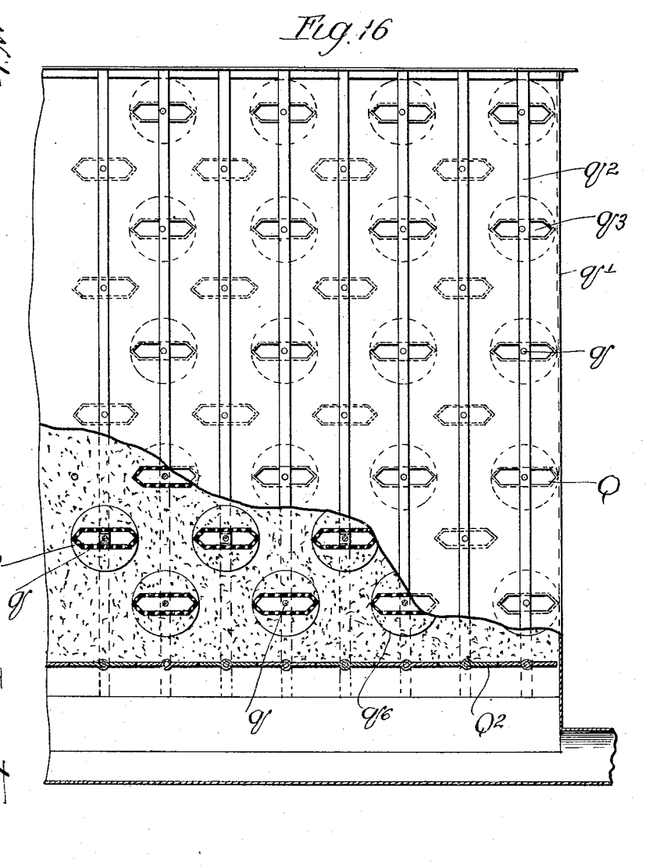
Fig. 16 is a partial side view with parts shown in section of a further modification of malting unit.
Figure 17:
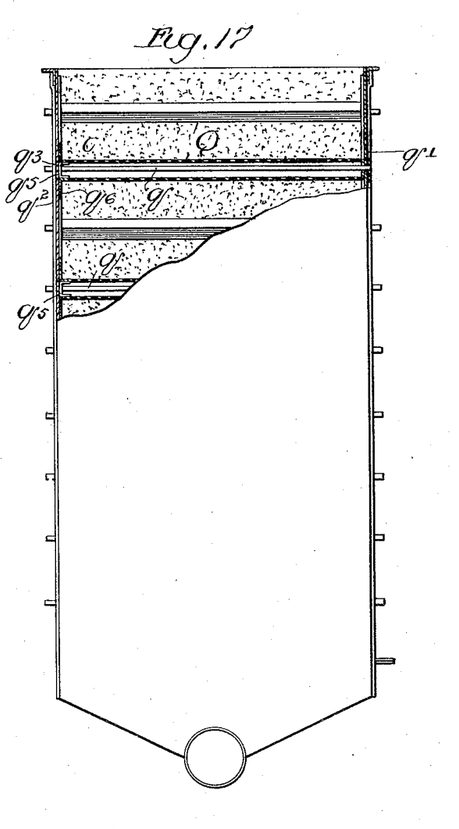
Fig. 17 is a transverse vertical section thereof.

In Figs. 16 and 17 I have shown a modified arrangement of the rotating or dumping shelves. In this form the several shelves Q, unlike the shelf-sections of the form shown in Figs. 6 to 10, do not meet edge to edge to constitute a series of continuous shelves; but, on the other hand, the shelves of each horizontal set are separated by spaces and the shelves of one set are arranged opposite to the spaces between the shelves of adjacent shelves. Said shelves Q are hollow and the walls thereof are perforated to permit air delivered thereto to permeate the body of malt in the unit. In this form of unit the space of the unit is entirely filled with grain or malt, the shelves being embedded therein; but the arrangement of the shelves distribute the weight of the contents upon all the shelves alike and prevents undue compression thereof at the bottom of the unit. Each tubular shelf is open at one end to the outside of the unit and is closed at its other end, and the shelves of any two adjacent sets open on opposite sides of the unit, whereby air may be admitted to the unit and the malt or grain therein through the hollow or tubular shelves in the same general manner from aisles or intermediate passages between the rows of units as air is admitted to the forms of units already described. Extending through each shelf is a bearing-shaft $q$, which has bearing at the closed end of the shelf in the wall $q'$ of the unit and has bearing at the open end of the shelf in a bar $q^2$, extending across an opening $q^3$ in the wall of the unit in line with the opening in the end of the shelf. A number of said bars $q^2$ are provided and attached to the outer faces of the walls of the units across said openings therein. The bearing-shafts are attached to the hollow shelves at the open end thereof by extending through and fitting in apertures in short cross-bars $q^5$ at the open ends of said shelves. Flanges $q^6$ at the open ends of the tubular shelves, fitting flat against the inner faces of the walls around the openings $q^3$ in said walls, prevents the escape of grain therethrough. The bottom wall of the unit is composed of a plurality of rocking or dumping sections $Q^2$, which are constructed and operate substantially as do the shelf-sections shown in Figs. 6 to 10, inclusive. When the unit shown in Figs. 16 and 17 is to be dumped, the lower shelf-sections $Q^2$ are rotated into vertical positions and the tubular shelves are also turned into vertical positions, thereby permitting the grain to fall down between the same to a suitable conveyer beneath.

Figure 18:
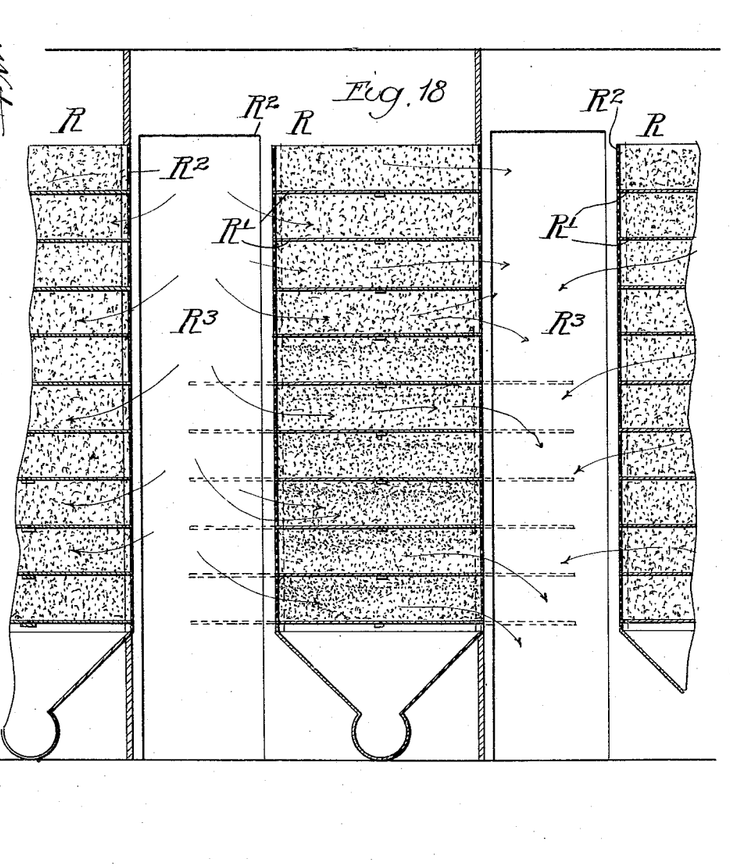
Fig. 18 is a cross-section taken through three adjacent units of a modified construction.

In Fig. 18 is shown diagrammatically another form of unit R of that kind which is adapted to be entirely filled and provided with shelves R', the function of which is to support the grain or malt in the unit in such manner as to prevent the same from packing by its own weight. The shelves may be opened and closed by sliding away from and toward each other in the same manner as in the construction illustrated in Fig. 13 or in any other suitable manner. The side walls $R^2$ of said unit R are made of continuous perforated plates, so that the air passes horizontally through the grain or malt. The shelves are therefore solid or imperforate. Preferably the units are made relatively narrow in the direction in which the air passes therethrough. This form of unit may be made stationary or portable, and the units are arranged in rows with aisles $R^3$ between the same.

Figure 19:
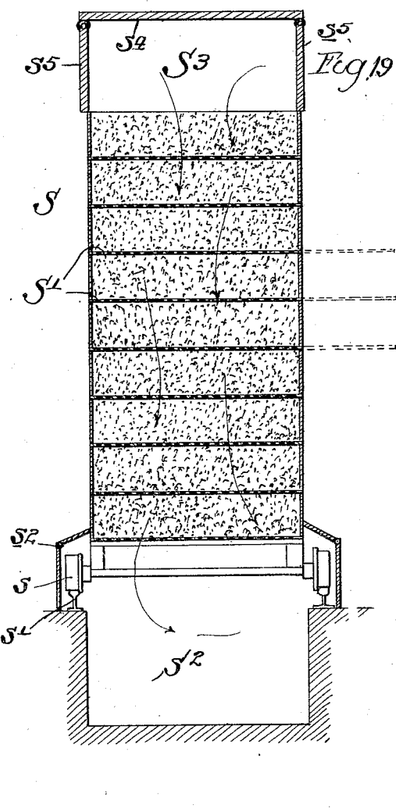
Fig. 19 is a cross-section of a still further modified form of unit.

In Fig. 19 is indicated diagrammatically a form of unit S, in which the entire area of the unit is filled and shelves S' are employed to prevent packing or matting of the malt or grain by its weight. Said shelves are perforated and may be made of either of the continuous forms hereinbefore described. In this construction the unit is placed over a suitable air-conduit $S^2$ and is provided at its top with another conduit $S^3$ and the air passes vertically through the compartments of the unit and the perforated shelves from one conduit to the other. The unit S is shown as mounted on wheels $s$, that travel on rails $s'$ at the sides of the conduit $S^2$, and shields $s^2$ are employed to prevent the lateral escape of air from or to the conduit. The upper conduit $S^3$ may be constructed in any suitable manner to afford a reasonably air-tight structure when fitted to the top of the unit, while at the same time permitting the unit to be moved therefrom. As herein shown, it consists of a fixed top wall $s^4$ and swinging side walls $s^5$ $s^5$, which may be swung upwardly to permit movement of the unit to and from its place and which are adapted to engage the upper part of the unit in a manner to constitute air-tight joints. The shelves arranged one above the other, as described, and supported on a frame or structure common to all the shelves may be constructed and supported in various other ways, and other means than shown may be employed for turning the grain during the process of germination and for transferring the grain and malt from place to place as demanded by the several steps of the process of malt production. For instance, instead of mounting the units on wheels as is herein shown they may be otherwise made portable in order that the malt and grain may be transferred from place to place while contained in the units.

I claim as my invention—

1. In a malting apparatus a plurality of malting units, located side by side, each comprising a plurality of closely-spaced shelves located one above the other, for supporting the grain or malt in separate thin layers, a frame common to and supporting all said shelves, means for turning the grain or malt comprising means for discharging the same from a unit, and depositing it on the shelves of another or the same unit, and means for separately admitting air to the contents of the several shelves in a manner to limit the passage of the same air through a single layer.

2. A malting device comprising a plurality of shelves located one above the other for supporting the grain or malt in separate layers, a frame common to and supporting all of said shelves, and a plurality of air-openings in the side walls of said frame opening separately to the exterior of the device through which air is directed horizontally to said layers, said shelves being movable in the frame to discharge the contents of the shelves.

3. A malting device comprising a plurality of perforated shelves arranged one above the other for supporting thereon malt or grain in layers, a frame common to and supporting all of said shelves, and side and end plates of said frame constituting the side and end walls of compartments, of which the shelves constitute the bottoms, each of the compartments being provided in one wall with an air-admission opening, and being closed at its opposite wall, the air-openings of adjacent compartments being located alternately on opposite sides of the device or unit.

4. A malting device comprising a plurality of perforated shelves arranged one above the other for supporting thereon malt or grain in layers, a frame common to and supporting all of said shelves, means for discharging the contents of said shelves therefrom, and side and end plates on said frame constituting the side and end walls of compartments, of which the shelves constitute the bottoms, the upper part of one vertical wall of each compartment terminating short of the bottom or shelf of the superjacent compartment, the compartments being otherwise closed and the openings of the adjacent compartments being located alternately on opposite sides of the device or unit, each compartment being adapted to be filled to the level of its opening, whereby there is provided above said layer a space constituting an air-passage through which air is distributed to the malt below.

5. A malting device comprising a plurality of superposed compartments having perforated bottoms and upon which the grain or malt is supported in layers, each compartment being open at one side at the top thereof and the openings of adjacent compartments being arranged alternately on opposite sides of the compartments.

6. A malting device or unit comprising a plurality of closely-spaced shelves located one above the other for supporting thereon grain or malt in separate layers and constituting the bottoms of superposed compartments, a frame common to and supporting all of said shelves and compartments and means for moving said device or unit from place to place.

7. A malting device or unit comprising a wheeled frame and a plurality of closely-spaced shelves supported one above the other thereon and constituting the bottoms of compartments adapted to receive superposed layers of grain or malt.

8. A malting device or unit comprising a wheeled truck, a plurality of vertical posts rising therefrom, plates extending between and fastened to said posts and constituting the side and end walls of the unit, horizontal shelves extending between and supported in opposing walls and dividing the unit into a plurality of superposed compartments, said walls being provided with air-openings to permit the air to pass horizontally into the compartments for contact with the grain or malt supported on said shelves.

9. A malting device or unit comprising a wheeled frame, a plurality of closely-spaced perforated shelves forming the bottoms of superposed compartments supported on said frame, each compartment being provided in one vertical wall at its top with an air-opening and being closed in other parts of its vertical walls, the openings of adjacent compartments being arranged on alternately opposite sides of the units.

10. An improved system or apparatus for producing malt, comprising a single-story room or apartment, a plurality of malting units located side by side on the floor of said room and separated by aisles constituting air-passages, said units filling the principal part of the space between the floor and ceiling of the room, and means for directing air through certain of said aisles, horizontally through the units, and discharging it through other adjacent aisles.

11. An improved system or apparatus for producing malt, comprising a room or apartment, a plurality of malting units located side by side on the floor of said room, each embracing a plurality of shelves located one above the other, and upon which the grain or malt is arranged in layers, and supported upon a frame common to all, said units being separated by spaces arranged to constitute defined aisles or air-passages, and means for directing air through said aisles and over the layers of malt or grain on said shelves.

12. An improved system or apparatus for producing malt, comprising a room or apartment, a plurality of malting units located side by side on the floor of said room and separated by aisles constituting air-passages, said units filling substantially the space between the floor and ceiling of the room, means for directing air through certain of said aisles and horizontally through the units and discharging it through other adjacent aisles, and independently-operable doors or valves, one at the end of each aisle, whereby the aisles may be changed from high to low pressure aisles, and the direction of the air through the units reversed.

13. An improved system or apparatus for producing malt, comprising a suitable room or apartment, a plurality of units located side by side on the floor of said room, each comprising a plurality of compartments located one over the other in which the malt or grain is supported in layers, said units substantially filling the vertical space between the floor and ceiling of the said room, said units being separated by spaces constituting aisles or air-passages, and the compartments being provided in their vertical walls with openings through which air enters for contact with the layers of grain or malt in the compartments, and means for directing air through said aisles or passages to the units.

14. An improved system for producing malt, comprising a suitable room or apartment, a plurality of units on the floor of said room, and substantially filling the space between the floor and ceiling of the room, and means for turning the grain or malt comprising means for discharging the same from the units and redepositing it therein.

15. The improved malt house and apparatus described comprising a germinating-room, a drying-room, a plurality of steep-tubs, a plurality of malting units located side by side in said germinating and drying rooms and substantially filling the vertical spaces between the floors and ceilings of the germinating and drying rooms, said units each comprising a plurality of shelves located one above the other, upon which the malt or grain is arranged in layers, means for directing steeped grain from the steep-tubs to the units in the germinating-room, means for directing the green malt to the units in the drying-room, and means for directing air through said units in contact with said layers of grain or malt on said shelves.

16. The improved malt house and apparatus described comprising a germinating-room, a drying-room, a plurality of steep-tubs, a plurality of malting units located side by side in said germinating-room, and substantially filling the vertical space between the floor and ceiling of the germinating-room, said units each comprising a plurality of shelves located one above the other, upon which the malt or grain is arranged in layers, means for directing steeped grain from the steep-tubs to the units in the germinating-room, means for directing the green malt to the drying-room, and means for directing air to the germinating and drying malt.

17. The improved malt house and apparatus described comprising a germinating-room, a drying-room, a plurality of steep-tubs, a plurality of malting units located side by side in said germinating and drying rooms, and substantially filling the vertical spaces between the floors and ceilings of the germinating and drying rooms, said units each comprising a plurality of shelves located one above the other, upon which the malt or grain is arranged in layers, means for directing steeped grain from the steep-tubs to the units in the germinating-room, means for directing the green malt to the units in the drying-room, means for directing air through said units in contact with said layers of grain or malt on said shelves, and means for discharging the malt or grain from said units and redepositing thereon for the purpose of turning the grain or malt.

18. The improved malt house and apparatus comprising a germinating-room, a drying-room, tracks in said rooms, a plurality of wheeled malting units on said tracks, a track connecting the tracks of the germinating and drying rooms, means for transferring the units from one track to the other in the germinating-room, and mechanism for transferring the grain from one unit to the other for the purpose of turning the same.

19. The improved malt house and apparatus comprising a germinating-room, a drying-room, tracks in the germinating-room, a plurality of units, means for transferring the grain from one unit to the others and means for transferring the units from one track to the other.

20. An improved system or apparatus for producing malt comprising a room or apartment, a plurality of malting units located side by side on the floor of said room and separated by aisles constituting air-passages, said units each comprising a plurality of vertically-separated, closely-spaced shelves on which the malt is supported in thin layers and the units filling substantially the space between the floor and ceiling of the room, means for directing air through certain of the aisles and through the units and discharging it through other adjacent aisles, and means for reversing the direction of the air-currents through said units whereby either of two aisles at the sides of a unit may be a plenum or vacuum aisle.

21. The improved system or apparatus for producing malt comprising a single-story room or apartment, a plurality of malting units located side by side on the floor of the room, each comprising a plurality of vertically-separated, closely-spaced shelves on which the malt is supported in thin layers, said units substantially filling the space between the floor and ceiling of the room, and means affording prescribed air-passages located on opposite sides of each unit whereby air is directed from one passage, through the unit and to the other passage.

22. The improved system or apparatus for producing malt comprising a single-story room or apartment, a plurality of malting units located side by side on the floor of the room, each comprising a plurality of vertically-separated, closely-spaced shelves on which the malt is supported in thin layers, said units substantially filling the space between the floor and ceiling of the room, means affording prescribed air-passages located on opposite sides of each unit whereby air is directed from one passage, through the unit and to the other passage, and means whereby the direction of air through said passages and through the units may be changed.

23. An improved system or apparatus for producing malt comprising a single-story room or apartment, a plurality of malting units located side by side on the floor of said room and separated by aisles constituting air-passages, said units filling the principal part of the space between the ceiling and floor of the room and each comprising a plurality of closely-spaced shelves constituting the bottoms of superposed compartments upon and in which the malt is supported in thin layers, and means for directing air through certain of said aisles and through the units and discharging it through other adjacent aisles.

24. An improved system or apparatus for producing malt comprising a single-story room or apartment, a plurality of malting units side by side therein each comprising a single vertical series of closely-spaced, superposed shelves, said shelves being movable to permit the layers of malt supported thereon to be dumped therefrom, the units substantially filling the space between the ceiling and floor of the room, and means affording prescribed air-passages located on opposing sides of each unit, the air being directed from one passage, through the unit and into the other passage.

In testimony that I claim the foregoing as my invention I affix my signature, in presence of two witnesses, this 1st day of April, A. D. 1904.

WILLIAM P. RICE.

Witnesses:
WILLIAM L. HALL,
GERTRUDE BRYCE.